June 28, 1938.  R. A. STEVENSON  2,122,074
SEWAGE TREATMENT PROCESS
Filed Dec. 15, 1936
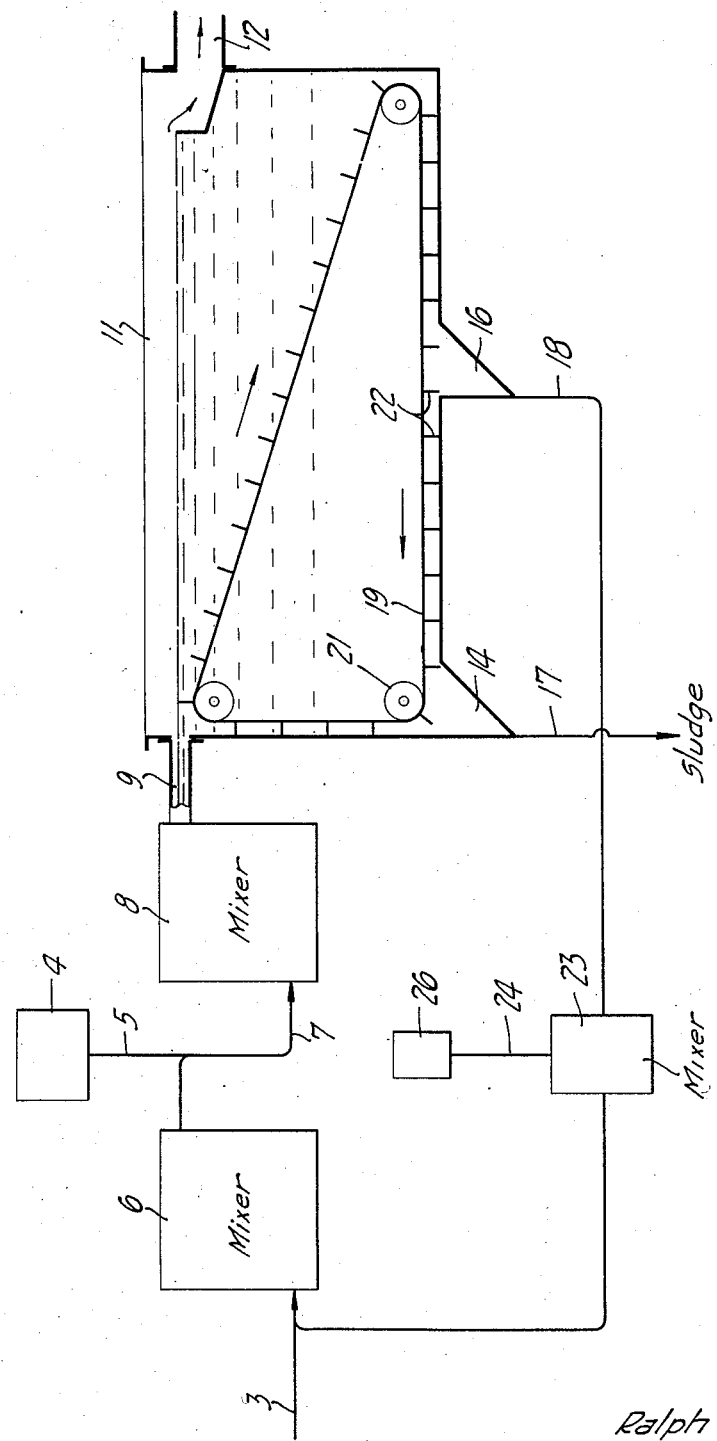
INVENTOR.
Ralph A. Stevenson
BY Robert H. Eckhoff
ATTORNEY.

Patented June 28, 1938

2,122,074

UNITED STATES PATENT OFFICE 2,122,074

SEWAGE TREATMENT PROCESS

Ralph A. Stevenson, San Marino, Calif.

Application December 15, 1936, Serial No. 115,957

5 Claims. (Cl. 210—2)

This invention relates to a sewage treatment process, one contemplating economy in separation of sewage solids from water in a process utilizing a chemical coagulant.

While the chemical clarification of sewage has many advantages over clarification by other means, the installation of chemical sewage treatment plants in the past decade has not been extensive. One thing that has of course operated in favor of existing practices has been the fact that the capital invested in the plants has been so considerable that plants could not be justifiably discarded on the saving to be made from chemical treatment alone. Assistance in this direction has been given by increased technical developments enabling the capacity of existing plants to be materially increased even beyond the capacity deemed possible by their designers.

If chemical treatment of sewage is to be successfully practiced on a commercial scale, therefore, increased economies in utilization of the chemicals must be attained.

The process of the present invention is one enabling an increased economy to be secured from the utilization of a chemical coagulant. In my work at Palo Alto, California, as reported in "Western Construction News and Highway Builder", for November 10, 1932, and in "Sewage Works Journal", vol. 5, pages 53 to 60 (1933), I have disclosed the advantage of the return of sludge mixed with an incoming sewage stream, and in "Water Works and Sewage", for March, 1933, I have disclosed operating information gained upon this plant and the advantages thereof.

This process contemplated a primary settling in a first basin, the sludge removed from this basin being separated from contact with the sewage stream and thereafter suitably treated in a digester, filter or other means. The mixed effluent from the first basin is mixed with a coagulant, such as ferric chloride, and thereafter introduced into a second basin. The sludge from the second basin is returned to mix with the incoming raw sewage stream, while the clear water effluent is discharged, chlorine being added if desired. This process has been looked upon with considerable favor, and a plant operating on the principle thereof has been successfully used for several years past at Birmingham, Alabama.

The process of this invention contemplates even further economies in the return of the sludge, as well as in the apparatus installation required. Instead of requiring two sedimentation basins, I now find that one will suffice. In addition, I am able to secure an even more efficient use of the coagulant.

It is an object of the present invention to provide an improved sewage treatment process, one enabling an increase in the economy of utilization of a chemical coagulant.

Another object of the present invention is to provide a novel apparatus for separation of sewage from the stream carrying the same.

The invention includes other objects and features of advantage, some of which, together with the foregoing, will appear hereinafter, wherein the present preferred forms of the process and apparatus are disclosed.

In the drawing, the single figure is a diagrammatic representation of an apparatus and a flow sheet for practicing the invention.

The process presupposes the separation of large solid masses, large foreign bodies, such as dead animals, by the use of suitable grit bars and other means well known in the art, so that there is delivered to the plant for treatment a sewage stream containing suspended solids to be removed by a chemical treatment. This sewage stream is passed through a suitable mixing apparatus indicated generally at 6 and 8, wherein it is thoroughly mixed with a sludge introduced through line 18. The character and source of this sludge will be presently disclosed. This apparatus can take any form well known in the art, but I prefer to use such a mixing apparatus as that disclosed in the Langelier Patent No. 1,605,596, of November 2, 1926.

After passage through this equipment, the stream is conducted through conduit 9 into a settling basin indicated generally at 11. The basin is usually made rectangular in form, and of such a size that a considerable reduction in velocity of the sewage stream occurs therein so that the solids bedded in the stream can separate therefrom. This basin can be either rectangular or circular in design, but in the drawing I have only disclosed an apparatus which is rectangular in form.

The basin is provided with an outlet 12 through which the effluent is removed. Between the inlet and the outlet the velocity of flow is so reduced, due to the increase in cross-section of the conduit provided by the basin 11, that settling of the solids occurs. It will be of course apparent that solids of heavy density will settle quickly, while those of lighter density will settle only after a considerable period of time. The bottom of the basin will therefore become covered with solids of varying density, the density decreasing as the distance away from the inlet 9 increases, so that at a point adjacent the inlet one will find the heavy solids, while at a point remote from the inlet, but adjacent to the outlet 12, will be found the particles of lighter density.

In my previous process, I contemplated collection of all of the solids in one mass, and return of these to the incoming sewage stream. In accordance with this invention, I contemplate the selective collection of the solids and return of only a portion thereof. I have discovered that the heavier solids, those which settle adjacent the inlet 9, are of little value in treating an incoming sewage stream, and I therefore contemplate their removal from the process.

I have further found that the lighter particles, those settling at a goodly distance from the inlet to the settling basin, are the most effective in the treatment of the incoming sewage stream, because they contain a relatively high percentage of residual components of the coagulant employed. These residuals can be effectively used in treating the incoming raw sewage stream. To this end, therefore, I provide means for collecting the solids selectively, and separating them from contact with the flowing sewage stream.

In accordance with my invention, I provide a plurality of separate collecting means in the bottom of the basin 11. The bottom of the basin is usually flat, and adjacent to the inlet 9 I provide a collecting trough 14. At some distance from the bottom, I provide a second collecting trough 16. Sludges of varying densities settle on the bottom of the basin and are subsequently collected selectively in these settling means.

That sludge collected in the trough 14 is removed through line 17 to provide the effluent sludge from the process. This sludge can be removed to a digester to be mineralized in a well known manner, or else dewatered on a dewatering bed, filtered, or otherwise treated, so as to be converted into fertilizer, or else burned, or otherwise treated or disposed of in any manner that is deemed desirable.

Those solids collected in collecting trough 16 are removed through line 18, and are reintroduced into the incoming sewage stream to be mixed therewith in the mixer 6.

While it is possible to build the basin 11 with a very sharply sloping bottom, so that the sludge settles thereon and collects in the collecting troughs, the angle of slope necessary is relatively steep, and I therefore prefer to use a mechanical collecting means and a flat, practically horizontal bottom. As a collecting means, I have shown a Link belt type of scraper, including a conveyor chain structure, indicated generally at 19, trained over sprockets 21 and carrying squeegees or push-bars 22. This mechanism is suitably driven so that it advances slowly along the bottom of the basin in a direction opposite to that of the flow, advancing the sludge which has settled on the bed of the basin bottom into each of the collecting troughs. In this way, a mechanical separation or segregation of the sludge according to density is possible.

Depending upon the type of sewage dealt with, the position of the trough 16 should be varied. For example, upon a heavy industrial sludge it can be placed about midway of the basin, while for a domestic sewage, such as that which occurs at Shades Valley Plant at Birmingham, Alabama, about two-thirds of the way along the bottom from the inlet suffices. The exact location of this depends upon settling rate tests. Sewage for any community differs from that of another community, because of the various factors affecting the makeup of the sewage. It will be of course a simple experimental matter to determine this pure engineering detail.

The sludge returned through line 18 is collected in the collecting trough 16. It will be found that this is largely made up of the flocculated coagulants and lighter particles which have not been collected into heavy dense masses. These contain a considerable proportion of coagulant employed. Their return to the incoming sewage stream will provide several advantages and economies. For example, assuming ferric chloride to be the coagulant employed, the flocculant material returned will carry a considerable percentage of ferric hydroxide. Introduction of this into the incoming sewage stream will serve to fix the odors thereof, the ferric hydroxide reacting with the hydrogen sulphide and other sulphur compounds to form a ferric sulphide.

In addition, it will react with other compounds and will so react the incoming sewage stream as to satisfy substantially entirely the reactive capacity thereof with the iron. This will have the advantage that once the coagulant is added, it will be effective as a coagulant and not be employed simply to satisfy the reactive capacity of the sewage for the coagulant. The coagulant will thus be available to act substantially entirely as a coagulant and a materially lesser quantity required.

While I have mentioned ferric chloride as the coagulant, of course other coagulants, such as alum or chlorinated copperas, can be employed.

In some instances it may be found desirable to add the coagulant to the sludge return line 18. To provide for this, I have shown a coagulant feeder 23, the coagulant being supplied through line 24 from a source 26. Instead of a coagulant, chlorine can be added to regenerate in part or entirely the coagulant components present.

The coagulant for the incoming raw sewage stream is added from a source or through a line 5 into line 7 prior to passage of the incoming sewage stream into the mixer 8. This mixer is placed after mixer 6, so that the coagulant is not added until after the reactive capacity of the sewage sludge has been satisfied by admixing therewith the returned sludge. The coagulant added into mixer 8 can be ferric chloride, alum, chlorinated copperas, with or without free chlorine. The coagulant addition at this point may be omitted if it is desired to add the coagulant or provide a chlorine treatment on the sludge returned through line 18. Depending upon the particular type of sewage, variations in this detail can be made beneficially, each installation providing a different experimental difficulty in this respect.

I claim:

1. A process for treating sewage comprising mixing a coagulant into a flowing sewage stream, subjecting said flowing sewage stream containing coagulant to a single settling operation to separate therefrom water borne solids of different densities, collecting so separated solids of different densities at least at two different points in the flow of said stream, removing from contact with said stream heavy solids collected at one point, and removing from contact with said stream lighter solids collected at another point and returning them to the flowing stream prior to addition of the coagulant but at a point in the flow of said stream whereat said heavy solids are present.

2. A process for treating sewage comprising adding a coagulant to a flowing sewage stream and settling said flowing sewage stream containing said chemical coagulant to remove therefrom in a single settling operation coagulated masses of relatively great density and substantially flocculant uncoagulated particles of relatively small density, collecting substantially all of said masses together and removing them from contact with said stream, collecting substantially all of said particles and separating them from said stream and introducing at least a portion of them into said stream before addition of the coagulant but at a point in said stream whereat that material is present from which said coagulated masses of relatively great density result.

3. A process for treating sewage comprising adding a coagulant to a flowing sewage stream and selectively settling and collecting simultaneously from the same body of said sewage stream previously treated with said coagulant heavy coagulated masses and substantially flocculent uncoagulated particles, separating from contact with said stream the collected heavy masses, separating from contact with said stream the substantially flocculent uncoagulated particles and introducing at least a portion thereof into an incoming sewage stream prior to any settling thereof and prior to said coagulant addition step.

4. A process for treating sewage consisting in adding a coagulant to a sewage stream and flowing said sewage stream containing said coagulant over a path at such a low velocity that settling can occur therefrom, collecting solids settling during flow over an initial portion of the flow over said path and removing them from contact with the stream, collecting other solids settling during flow over a later portion of said path, removing the collected other solids from contact with the stream, returning at least a portion of said collected other solids to an incoming sewage stream and mixing said other solids into said stream prior to coagulant addition.

5. A sewage treatment apparatus comprising a settling basin having a bottom, a sewage inlet discharging into said basin, a first sludge collecting means in said bottom adjacent said inlet, a second sludge collecting means in said bottom remote from said inlet, means for sweeping said bottom to advance sludge therein into one of said sludge collecting means, means for returning sludge collected in said second sludge collecting means to said sewage inlet to mix with sewage flowing therein, and a chemical coagulant feeder for adding a coagulant to sewage between the point of return sludge addition to said sewage inlet and the point of discharge of said inlet into said basin.

RALPH A. STEVENSON.